(12) United States Patent
Watanabe et al.

(10) Patent No.: US 11,446,968 B2
(45) Date of Patent: Sep. 20, 2022

(54) TIRE

(71) Applicant: BRIDGESTONE CORPORATION, Tokyo (JP)

(72) Inventors: Jun Watanabe, Kokubunji (JP); Shin Sukegawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 231 days.

(21) Appl. No.: 16/763,229

(22) PCT Filed: Sep. 26, 2018

(86) PCT No.: PCT/JP2018/035749
§ 371 (c)(1),
(2) Date: May 12, 2020

(87) PCT Pub. No.: WO2019/093005
PCT Pub. Date: May 16, 2019

(65) Prior Publication Data
US 2020/0298631 A1    Sep. 24, 2020

(30) Foreign Application Priority Data
Nov. 13, 2017 (JP) .............................. JP2017-218605

(51) Int. Cl.
*B60C 19/00* (2006.01)

(52) U.S. Cl.
CPC .................................. *B60C 19/002* (2013.01)

(58) Field of Classification Search
CPC ............. B60C 19/002; A44B 18/0015; A44B 18/0019
See application file for complete search history.

(56) References Cited

U.S. PATENT DOCUMENTS

| 3,266,113 A * | 8/1966 | Flanagan, Jr. ..... A44B 18/0053 24/452 |
| 8,960,251 B2 | 2/2015 | Tanno et al. |
| 2005/0155686 A1 | 7/2005 | Yukawa et al. |
| 2009/0151837 A1 | 6/2009 | Uhlenbruch |
| 2009/0159172 A1 | 6/2009 | Tanno et al. |
| 2010/0018622 A1 | 1/2010 | Tanno et al. |
| 2012/0000588 A1 | 1/2012 | Tanno et al. |
| 2015/0151501 A1 | 6/2015 | Tanno |
| 2017/0113496 A1 | 4/2017 | Tanno |
| 2017/0274705 A1 | 9/2017 | Kon et al. |
| 2018/0215209 A1* | 8/2018 | Naruse .................. B60C 19/002 |

FOREIGN PATENT DOCUMENTS

| CN | 101462473 A | 6/2009 |
| CN | 101646570 A | 2/2010 |

(Continued)

OTHER PUBLICATIONS

Shiroza, English Machine Translation of JP 2012126380, 2012 (Year: 2012).*

(Continued)

*Primary Examiner* — Robert C Dye
*Assistant Examiner* — Brendon Charles Darby
(74) *Attorney, Agent, or Firm* — Kenja IP Law PC

(57) ABSTRACT

Disclosed is a tire including: at least one pin protruding from an inner circumferential surface of a tread portion of the tire toward a tire radial direction inner side; and a noise damper caught by the at least one pin, wherein the at least one pin has a distal end with a diameter smaller than that of portions other than the distal end.

13 Claims, 6 Drawing Sheets

(56) References Cited

FOREIGN PATENT DOCUMENTS

| | | |
|---|---|---|
| CN | 106457932 A | 2/2017 |
| DE | 102009024454 A1 | 12/2010 |
| JP | 2008254658 A | 10/2008 |
| JP | 4318639 B2 | 8/2009 |
| JP | 2012011986 A | 1/2012 |
| JP | 2012025319 A | 2/2012 |
| JP | 2012126380 A | 7/2012 |
| JP | 2013010324 A | 1/2013 |
| KR | 1020170098448 A | 8/2017 |
| WO | 2008126506 A1 | 10/2008 |
| WO | WO-2016027723 A1 * | 2/2016 ........... B60C 19/002 |
| WO | 2016039121 A1 | 3/2016 |

OTHER PUBLICATIONS

Dec. 11, 2018, International Search Report issued in the International Patent Application No. PCT/JP2018/035749.
May 19, 2020, International Preliminary Reporton Patentability issued in the International Patent Application No. PCT/JP2018/035749.
Jun. 23, 2021, search result of the Extended European Search Report issued by the European Patent Office in the corresponding European Patent Application No. 18875621.7.
Aug. 27, 2021, search result of Office Action issued by the China National Intellectual Property Administration in the corresponding Chinese Patent Application No. 201880072666.4.

* cited by examiner

TIRE

TECHNICAL FIELD

This disclosure relates to a tire, and more particularly, to a low-noise tire having a noise damper on an inner circumferential surface side thereof.

BACKGROUND

One of tire noises known is a so-called road noise, which sounds like a low growl when travelling on a road, within a frequency range of 50 Hz to 400 Hz. A main cause of the road noise is known to be resonance vibration of air (cavity resonance) that is generated on the inner circumferential surface side of the tire. In order to reduce such road noise, JP4318639B (PTL 1) proposes a technique that involves fixedly attaching a noise damper to the inner circumferential surface of a tire to absorb the cavity resonance energy.

In addition, WO2016/039121 (PTL 2) describes a technique that involves sandwiching a noise damper between attachment portions provided on the inner circumferential surface of a tire, and holding the noise damper by means of the restoring force of the compressed noise damper.

CITATION LIST

Patent Literature

PTL 1: JP4318639B
PTL 2: WO2016/039121

SUMMARY

Technical Problem

However, in the tire described in PTL 1, since the noise damper is fixedly attached to the inner circumferential surface of the tire, heat dissipation from between the inner circumferential surface of the tire and the noise damper is inhibited, and heat easily accumulates therein. Further, in the technique of PTL 2, since the noise damper is sandwiched between multiple planes, heat can not be dissipated at the contact portions with these planes, and the heat dissipation effect is insufficient. As a result, thermal degradation may be accelerated and durability may be lowered.

There is a further demand for a method capable of holding a noise damper more stably than the techniques described in PTLs 1 and 2.

It would thus be helpful to provide a method of stably fixing a noise damper by a simple means without hindering the heat dissipation of the noise damper.

Solution to Problem

The inventor investigated the means for addressing the above issues, and discovered that by fixing a noise damper to multiple pins provided on an inner circumferential surface of a tread portion of a tire, and by devising the shape of the pins, the noise damper can be stably fixed without hindering the heat dissipation of the noise damper. Based on this discovery, the present disclosure was completed.

Primary features of this disclosure are as described below. A tire according to the present disclosure comprises: at least one pin protruding from an inner circumferential surface of a tread portion of the tire toward a tire radial direction inner side; and a noise damper caught by the at least one pin, wherein the at least one pin has a distal end with a diameter smaller than that of portions other than the distal end.

Advantageous Effect

According to the present disclosure, it is possible to provide a tire in which a noise damper is stably fixed by a simple means without hindering the heat dissipation of the noise damper.

BRIEF DESCRIPTION OF THE DRAWINGS

In the accompanying drawings.

DETAILED DESCRIPTION

Figure 1:
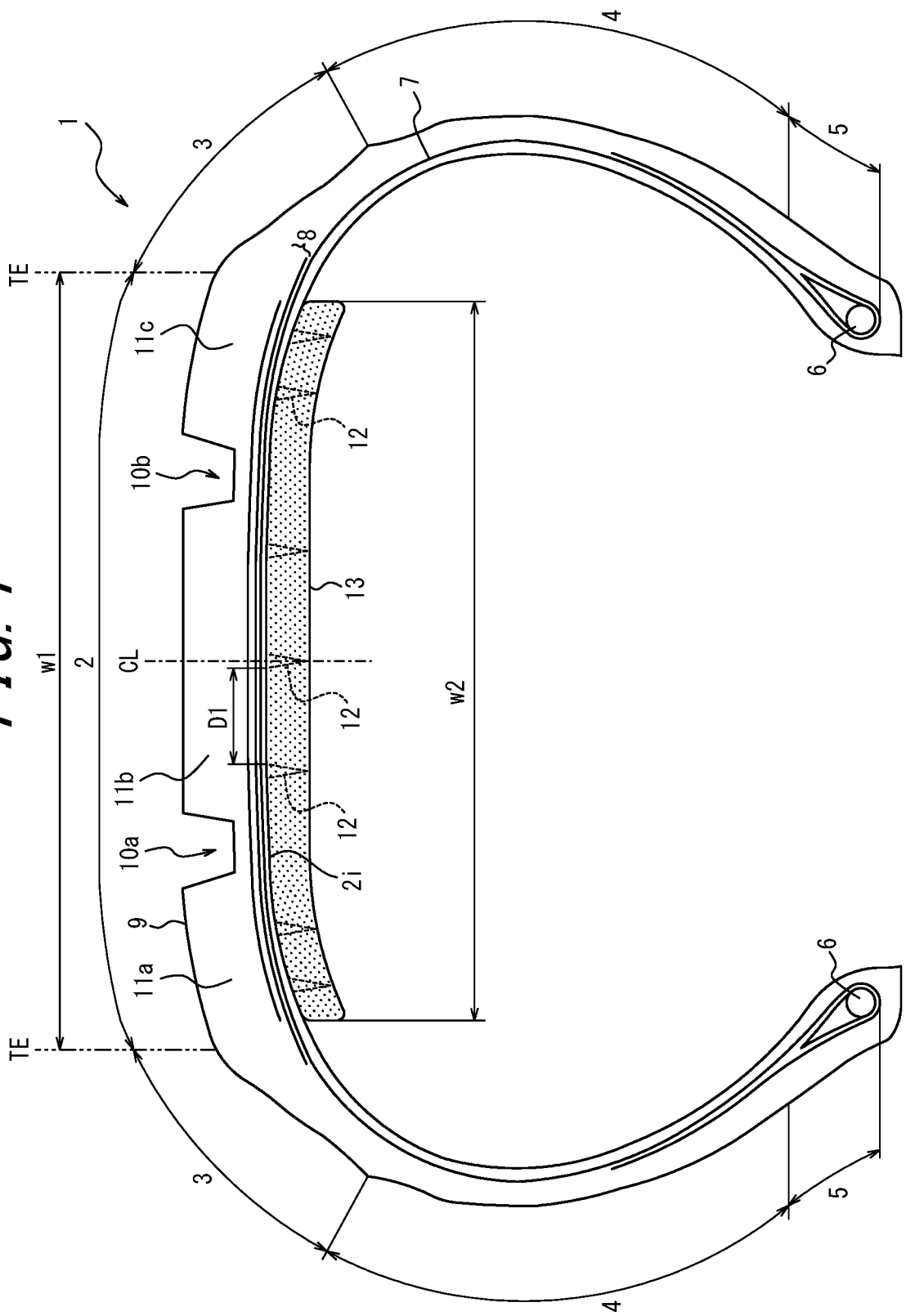
FIG. 1 is a cross-sectional view of a tire according to one of the embodiments of the present disclosure.

The following provides a description of embodiments of the tire according to the present disclosure with reference to the accompanying drawings. In the drawings, like reference numerals refer to like parts throughout the various views unless otherwise specified.

FIG. 1 is a cross-sectional view of a tire according to one of the embodiments of the present disclosure.

A tire 1 comprises: a tread portion 2; a pair of sidewall portions 4 continuous with respective ends of the tread portion 2 in a tire width direction via a shoulder portion 3; and a pair of bead portions 5 provided at respective ends continuous with the pair of sidewall portions 4 inward in a tire radial direction.

The inner reinforcing structure and the like of the tire disclosed herein may be freely chosen. For example, in FIG. 1, the inner reinforcing structure and the like of the tire are similar to those of a regular tire. Specifically, the tire 1 comprises: a carcass 7 extending toroidally between a pair of bead cores 6; one or more (in this example, two) belt layers 8 arranged outward in the tire radial direction from the carcass 7; and a tread layer 9 arranged outward in the tire radial direction from the belt layers 8. Although the tread layer 9 may have any tread pattern, in FIG. 1, land portions 11a, 11b, and 11c are defined by circumferential grooves 10a and 10b.

The tire 1 comprises: at least one pin 12 protruding from an inner circumferential surface 2i of the tread portion 2 toward a tire radial direction inner side; and a noise damper 13. In the illustrated embodiment, seven pins 12 are arranged in a row in the tire width direction, and similar rows are arranged in the tire circumferential direction at equal or unequal intervals. The noise damper 13 is an annular body that is made of a sponge material, that has a width equal to or smaller than a tread width of the tire and is continuous in the tire circumferential direction, and that is caught by the pins 12 so as to be attached to the inner circumferential surface 2i of the tread portion 2.

The noise damper 13 made of a sponge material has a function such that voids formed on the surface and inside thereof convert the vibration energy of the vibrating air into heat energy. This suppresses cavity resonance on the inside of the tire, resulting in reduced road noise. As described above, the noise damper 13 is an annular body that is continuous over the entire region in the tire circumferential direction, and that is arranged on the inner circumferential surface 2i of the tread portion 2 with both ends in the tire circumferential direction abutting against each other. In the tire width direction, the noise damper 13 extends across a tire equatorial plane CL up to a length w2 smaller than a tire widthwise length w1 of the tread portion 2. Although the noise damper 13 is arranged symmetrically about the tire equatorial plane CL in FIG. 1, it may be arranged asymmetrically.

The following provides further details of the structure for catching the noise damper 13 by the pins 12. Each pin 12 has a distal end with a diameter smaller than that of portions other than the distal end. That is, in this embodiment illustrated in FIG. 1, the pin 12 is a conical body extending inward in the tire radial direction and gradually decreasing in diameter toward the distal end, with the inner circumferential surface side of the tread portion 3 of the tire as the base. When the pin thus configured is used, the noise damper 13 can be fixed with the pin 12 in such a manner that the pin 12 is inserted into the noise damper 13, and the noise damper 13 can be stably fixed to the inner circumferential surface 2i of the tread portion 3 with a simple means. Further, with this configuration, the noise damper 13 is not fixedly attached to the inner circumferential surface 2i of the tread portion 2, but rather lightly contacts the inner circumferential surface 2i. Therefore, heat dissipation from between the inner circumferential surface of the tire and the noise damper will not be hindered. Further, as the noise damper 13 is deformed while the tire is rolling, gaps are formed between the noise damper 13 and the inner circumferential surface 2i, allowing heat dissipation from the gaps. In addition, since both ends of the noise damper 13 in the tire width direction are open ends, a heat dissipation effect is also obtained from these ends.

Although the pin 12 has been described as a conical body in this embodiment, it may be an elliptical cone or a polygonal cone. Thus, in the case of the pin 12 being a conic solid, the pin can be easily inserted into the noise damper. Here, when an elliptical cone is used, the major axis of the ellipse is preferably arranged parallel to the tire circumferential direction. When the tire is rolling, an input is applied to the pins 12 along the tire circumferential direction, and the pins 12 can be hardly bent by having a shape that is long in the tire circumferential direction. The shape of the pin may be a shape other than a conic solid, for example, a shape whose diameter gradually decreases from the inner circumferential surface side of the tread portion 2 toward the tire radial direction inner side, but that does not have a sharp point. Further, the shape of the pin may be a shape including a portion extending at a constant diameter in the middle of the pin in its axial direction without a gradual decrease in diameter. Even when the pin 12 is not shaped as a conic solid as a whole, it is preferable that at least the distal end of the pin 12 be formed as a conic solid having an apex on the tire radial direction inner side. The reason that a conic solid such as a cone, an elliptical cone, or a polygonal cone has a pointed shape at the extreme end, and it can be easily inserted into the noise damper 13.

In the illustrated example, although the noise damper 13 is in contact with the inner circumferential surface 2i of the tread portion 2, the noise damper 13 may be inserted halfway in the axial direction of the pin 12 so as not to contact the inner circumferential surface 2i of the tread portion 2. With such a configuration, it is possible to further improve the heat dissipation performance as compared with the configuration in which the noise damper 13 constantly contacts the inner circumferential surface 2i.

Second Embodiment

Figure 2:
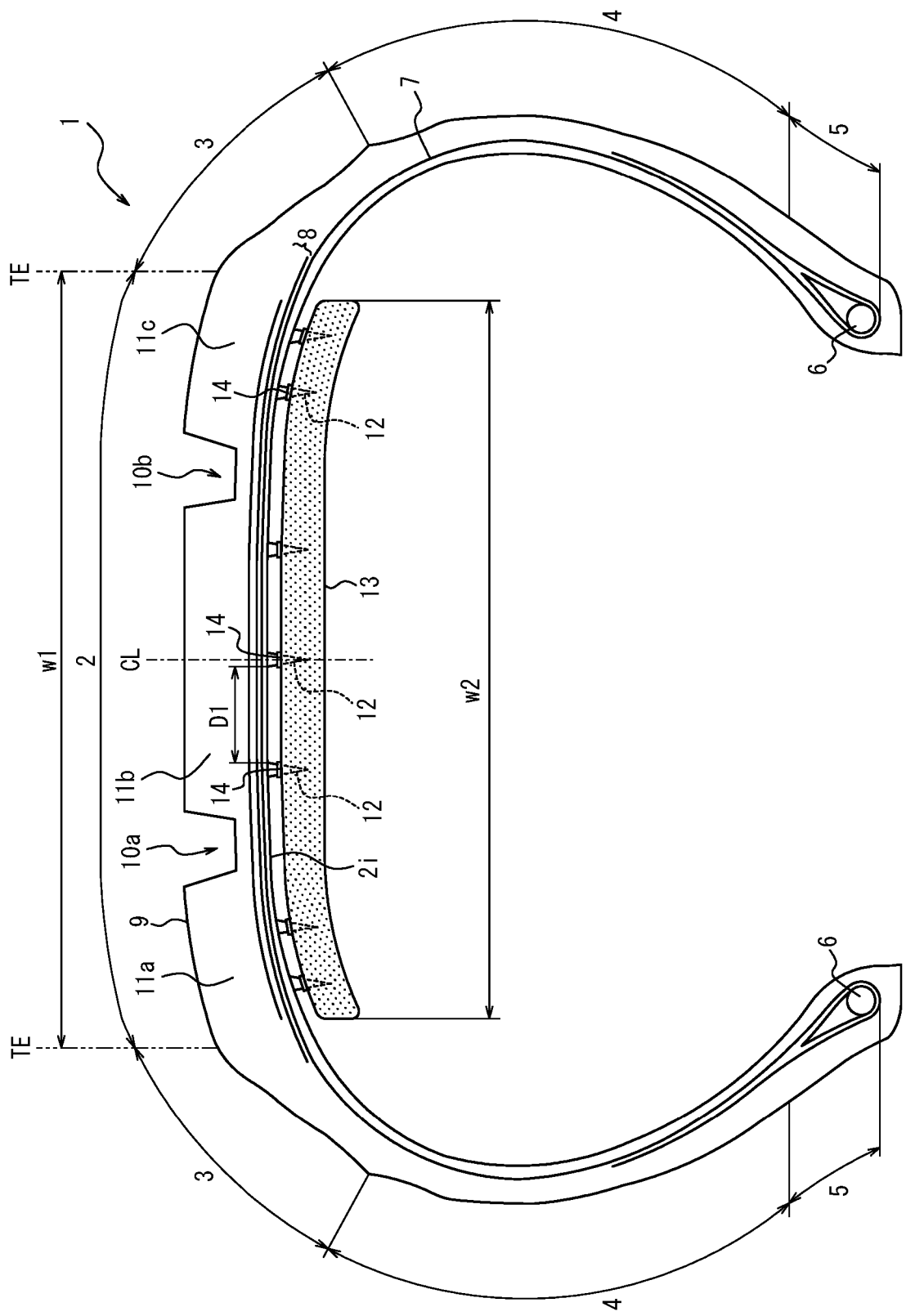
FIG. 2 is a cross-sectional view of a tire according to another embodiment of the present disclosure.
Figure 3:
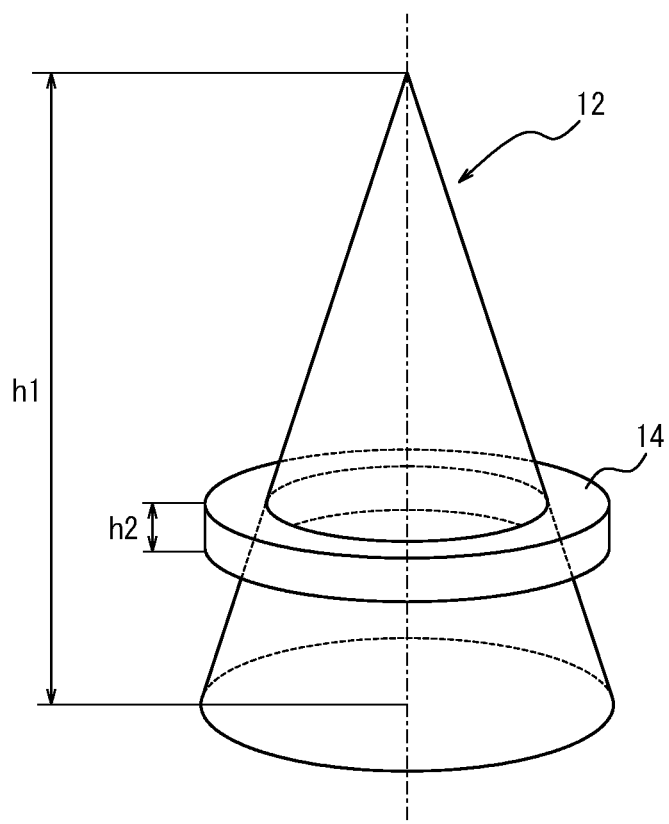
FIG. 3 is an enlarged perspective view for explaining one form of each pin and a flange portion thereof provided in the tire of FIG. 2.

As a second embodiment of the tire 1, a configuration in which a flange portion 14 is formed on each pin 12 will be described with reference to FIGS. 2 and 3. Although the tire 1 according to this embodiment differs from the above-described tire 1 in that each pin 12 is additionally provided with a flange portion 14, the configuration is otherwise the same. In this case, differences will be mainly described, and description of common features will be omitted. FIG. 2 is a cross-sectional view of a tire according to another embodiment of the present disclosure, and FIG. 3 is an enlarged perspective view for explaining one form of each pin and a flange portion thereof provided in the tire of FIG. 2. In FIG. 3, the pin 12 and the flange portion are illustrated in an inverted orientation in the tire radial direction to that in FIG. 2, and the noise damper 13 is omitted.

In this embodiment, the pin 12 is provided with, at least partially on its outer circumference, a flange portion 14 protruding in a direction transverse to the axial direction of the pin 12. In the illustrated example, the pin 12 is provided with, over the entire circumference of the pin 12, a disk-shaped flange portion 14 that protrudes in a direction perpendicular to the axial direction of the pin 12. Further, the flange portion 14 is arranged between the inner circumferential surface 2i of the tread portion and the noise damper 13. The flange portion 14 having the above shape functions as a stopper for keeping the noise damper 13 from moving further to the inner circumferential surface 2i side of the tread portion 2 than the flange portion 14 in a state in which the noise damper 13 is inserted into the pin 12. Therefore, gaps are reliably formed between the inner circumferential surface 2i and the noise damper 13 of the tread portion 2, and heat dissipation from between the noise damper 13 and the inner circumferential surface 2i will not be hindered, allowing heat dissipation from the gaps. In addition, a heat dissipation effect is obtained from both ends in the tire width direction of the noise damper 13. Moreover, the flange portion 14 may prevent a shift of the noise damper 13 to the inner circumferential surface 2i side due to the centrifugal force of the rolling tire. Furthermore, while the tire is rolling, the inner circumferential surface 2i and the noise damper 13 do not rub against each other, and it is possible to prevent deterioration due to wear of the inner circumferential surface and the noise damper, or damages due to frictional heat.

In the illustrated example, the flange portion 14 preferably protrudes in a direction perpendicular to the axial direction of the pin 12, yet it may protrude in other directions.

Furthermore, besides the disk-shape as depicted, the shape of the flange portion 14 may be any shape that is formed with an inner circumferential surface having a shape in contact with the outer circumferential shape of the pin 12 and an outer circumferential surface having, for example, a rectangular, polygonal, or irregular shape. In addition, in the illustrated example, although one flange portion 14 is shaped so as to extend over the entire circumference of the pin 12, it is also possible to arrange one or more flange portions 14 shaped so as to protrude from only a part of the circumference of the pin 12.

Figure 4A:
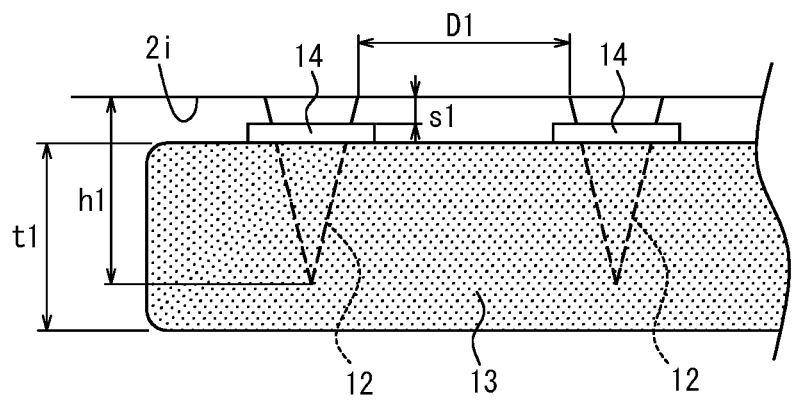
FIG. 4A is An enlarged cross-sectional view of a part of the tire of FIG. 2.

In addition, as depicted in FIG. 4A, which is an enlarged cross-sectional view illustrating a part of FIG. 2, it is preferable to arrange the flange portion 14 to be separated in the tire radial direction from the inner circumferential surface 2i of the tread portion 3. By separating the flange portion 14 from the inner circumferential surface 2i of the tread portion 2, it is possible to increase the volume of the gaps between the inner circumferential surface 2i and the noise damper 13, and to further enhance the heat dissipation performance of the noise damper 13.

More preferably, the flange portion 14 in the tire radial direction of the pin 12 is arranged on the inner circumferential surface 2i side of the tread portion 2 with respect to the center of the pin 12 in the tire radial direction. By arranging the noise damper 13 not too far from the contact patch on the road surface, it is possible to balance the noise damping function and the heat dissipation.

When the flange portion 14 is separated from the inner circumferential surface 2i as described above, a tire radial direction distance s1 between the flange portion 14 and the inner circumferential surface 2i of the tread portion 3 is preferably 0.5 mm or more and 50 mm or less. By setting the distance to 0.5 mm or more, heat dissipation can be promoted, and by setting the distance to 50 mm or less, it is possible to maintain high noise damping performance.

Figure 4B:
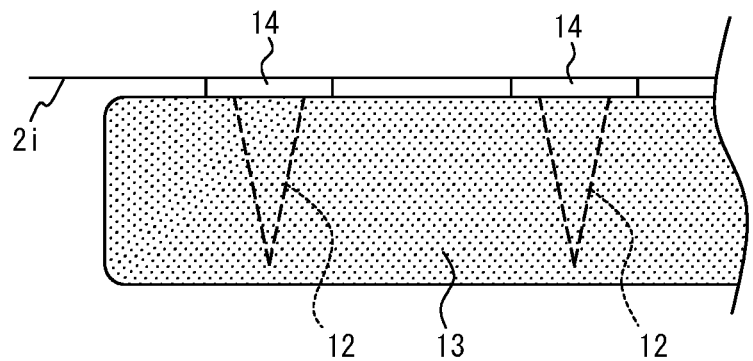
FIG. 4B is a cross-sectional view illustrating a variation of the arrangement of the flange portion.

As illustrated in FIG. 4B, the flange portion 14 may be arranged so as to abut against the inner circumferential surface 2i of the tread portion 3. In this arrangement, the flange portion 14 contacts or is integral with the inner circumferential surface 2i, and rigidity of each pin 12 can be increased. Even with this configuration, at the positions between the pins 12, gaps are formed between the inner circumferential surface 2i and the noise damper 13, allowing heat dissipation therefrom.

Alternatively, the flange portion 14 may be formed further toward the distal end side of the pin 12 than the inner circumferential surface 2i of the tread portion 2 and the noise damper 13. In this configuration, the noise damper 13 is positioned between the flange portion 14 and the inner circumferential surface 2i. The flange portion 14 functions as a stopper for preventing the noise damper 13 from shifting to the distal end side of the pin 12, thereby stably fixing the noise damper 13. In this configuration, at the time of manufacture, after inserting the noise damper 13 into the pins 12, each flange portion 14 may be mounted on the corresponding pin 12 from the distal end.

It is also preferable that the flange portion 14 protrude from the outer circumference of the pin 12 by 2.0 mm or more. With 2.0 mm or more protrusion, the flange portion 14 can sufficiently function as a stopper of the noise damper 13.

The flange portion 14 preferably has a tire radial direction length h2 of 1.0 mm or more. By providing the flange portion with a thickness of 1.0 mm or more, it is possible to secure a sufficient durability for supporting the noise damper 13.

The following provides further details of the features of the pins 12 and the noise damper 13 that are common to the first embodiment and the second embodiment.

In either embodiment, the pins 12 are preferably arranged in correspondence with land portions 11a to 11c of the tread portion 2. That is, in FIGS. 1 and 2, the pins 12 are respectively arranged in correspondence with the land portions 11a, 11b, and 11c of the tread section 2, but are not arranged in the regions corresponding to circumferential grooves 10a and 10b. In other words, while the tire is rolling, the tread portion 2 is deformed, and the deformation is apt to propagate, in particular, toward the inner circumferential surface of the tire at the locations where the grooves are formed. When pins 12 are disposed in such groove regions, the pins 12 may be distorted or produce heat due to the propagated deformation. Therefore, by arranging the pins 12 in correspondence with the land portions 11a to 11c, such inconvenience can be avoided.

Furthermore, at least some of the pins 12 are preferably arranged on and around the tire equatorial plane CL in the tire circumferential direction. While the tire is rolling, the tire inner circumferential surface is repeatedly deformed, and particularly in those regions on and near the tire equatorial plane CL, the tire inner circumferential surface is subject to a large strain. Therefore, by arranging the pins 12 in such regions, it is possible to prevent the noise damper 13 from falling off while the tire is rolling, and to improve the stability.

It is also preferable to arrange the pins 12 at a number density of 0.01 pcs/cm$^2$ to 0.4 pcs/cm$^2$ on the inner circumferential surface 2i of the tread portion 2. That is, on the inner circumferential surface of the tread portion 2, by setting the number density to 0.01 pcs/cm$^2$ or more, the noise damper 13 can be stably fixed, and by setting the number density to 0.4 pcs/cm$^2$ or less, it is possible to suppress a decrease in rigidity of the noise damper 13 itself.

The shortest distance D1 between adjacent pins 12 is preferably larger than a tire radial direction length h1 (hereinafter, simply referred to as the "length") of the pins 12. With this configuration, heat buildup or damages due to contacts between the pins 12 can be prevented when pins 12 are deformed while the tire is rolling.

It is also preferable that the shortest distance D1 between adjacent pins 12 be 150% or less relative to the length h1, not only in the tire width direction, but also in the tire circumferential direction. At or below 150%, the noise damper 13 can be stably fixed.

When emphasizing the stable fixing of the noise damper 13, the shortest distance D1 between adjacent pins 12 may be smaller than the tire radial direction length h1 of the pins 12. With this configuration, the noise damper 13 can be stably fixed. Preferably, the shortest distance D1 is 80% or less of the length h1.

The length h1 of the pins 12 is preferably 25% or more relative to the maximum thickness t1 of the noise damper 13. By setting h1/t1 to 25% or more, the noise damper 13 can be stably fixed.

The length h1 of the pins 12 may be, for example, 5 mm or more and 50 mm or less.

Figure 5:
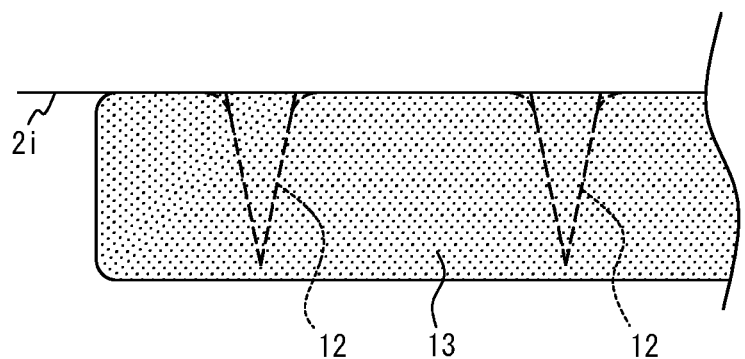
FIG. 5 is a cross-sectional view illustrating another variation of the pin.

Moreover, as illustrated in FIG. 5, each pin 12 may have, on its proximal end side, a plane with a curvature as its outline shape near a boundary with the inner circumferential surface 2i of the tread portion. As described above, by making the shape of each pin 12 smoothly continuous with the inner circumferential surface 2i, it is possible to suppress the occurrence of cracks at the boundaries between the pins 12 and the inner circumferential surface 2i.

In either embodiment, in addition to the aspect in which the noise damper 13 is continuous over the entire circumference as described above, the noise damper 13 may be configured to have both ends in the tire circumferential direction that are spaced apart from each other with a slight gap. In addition, the noise damper 13 may be an annular body in which a sheet-like sponge material is wound around more than once in the tire circumferential direction while shifting the material to the tire width direction so as not to cause overlaps of material turns. Moreover, in the noise damper 13, a plurality of sheet-like sponge materials may be intermittently arranged at intervals in the tire circumferential direction, or a plurality of sponge materials continuous over the entire circumference may be arranged in the tire width direction.

The noise damper 13 is preferably arranged in a region w2 that extends across the tire equatorial plane CL up to 25% or more of the tire widthwise length w1 of the tread portion 2. Within the range of 25% or more, the effect of reducing the cavity resonance energy of the noise damper 13 can be sufficiently obtained.

It is also preferable that the noise damper 13 satisfy the following numerical ranges in a standard state in which the tire is mounted on an applicable rim, applied with a prescribed internal pressure, and then unloaded. As used herein, an "applicable rim" refers to a rim specified currently or in the future by the standards below in accordance with tire size. The "applicable rim" refers to a standard rim ("approved rim" or "recommended rim") of applicable size specified in accordance with valid industrial standards for the region in which the tire is produced or used, such as the "JATMA Year Book" of the Japan Automobile Tire Manufacturers Association in Japan, "The European Tyre and Rim Technical Organisation Standards Manual" in Europe, and "The Tire and Rim Association, Inc. Year Book" in the United States of America (that is, the "rim" mentioned above includes, in addition to the current size, the size that can be included in these industry standards in the future; for example, the size described in "FUTURE DEVELOPMENTS" in the ETRTO 2013 edition). On the other hand, for a size not described in the above industrial standards, it refers to a rim having a width corresponding to the bead width of the pneumatic tire.

In addition, "specified internal pressure" refers to air pressure (maximum air pressure) specified in the JATMA YEAR BOOK and so on in accordance with the maximum load capability of a single wheel in the applicable size ply rating. For a size not described in the above industrial standards, it refers to air pressure (maximum air pressure) in accordance with the maximum load capability specified for each vehicle on which the tire is mounted.

In the standard state in which the tire is mounted on an applicable rim, it is preferable that when the space formed by the inner circumferential surface of the tire 1 and the outer surface of the rim on which the tire 1 is mounted is referred to as a tire lumen In, the noise damper 13 have a volume V1 that is 0.4% to 20% of the total volume of the tire lumen In. By guaranteeing 0.4% or more for the volume V1 of the noise damper 13 relative to the total volume of the tire lumen In, it is possible to obtain the effect of reducing the cavity resonance energy by a desired amount (for example, by 2 dB or more) more easily. The noise damper 13 more preferably accounts for 1% or more, even more preferably 2% or more, and particularly preferably 4% or more of the total volume of the tire lumen In. On the other hand, increasing the volume V1 of the noise damper 13 beyond 20% of the total volume of the tire lumen In can no longer increase the effect of reducing the cavity resonance energy. Rather, this may end up causing deterioration in the weight-balance in a state mounted on a rim. From this viewpoint, the volume V1 of the noise damper 13 is more preferably 16% or less, and particularly preferably 10% or less of the total volume of the tire lumen In. The above-mentioned volume ratio is not related to the number of noise dampers 13. That is, when a plurality of noise dampers 13 are used, the same effect can be obtained if the sum of the volumes of all of the noise dampers 13 satisfies the above-mentioned relationship of the volume ratio.

As described above, the noise damper 13 is formed from a sponge material. The sponge material is a sponge-like porous structure, and includes, for example, a so-called sponge having open cells formed by foaming rubber or a synthetic resin. In addition to the above-described sponge, the sponge material includes a web-like sponge in which animal fibers, plant fibers, synthetic fibers, and the like are interlaced and integrally connected. The "porous structure" is not limited to a structure having open cells, and includes a structure having closed cells.

In addition, the sponge material is easily deformed by contraction, bending, or the like. Therefore, even if the noise damper 13 made of a sponge material is in contact with the inner circumferential surface 2i of the tread, this condition does not substantially affect the deformation of the tire 1 during travelling.

Examples of raw materials of the sponge material include synthetic resin sponge such as ether-based polyurethane sponge, ester-based polyurethane sponge, and polyethylene sponge, and rubber sponge such as chloroprene rubber sponge (CR sponge), ethylene propylene rubber sponge (EPDM sponge), and nitrile rubber sponge (NBR sponge). From the perspectives of, for example, noise damping, light weight, foaming adjustability, and durability, it is preferable to use a polyurethane- or polyethylene-based sponge including ether-based polyurethane sponge, and so on.

Note that the material forming the noise damper 13 is not limited to the sponge material described above, and may be any material as long as it can be controlled so as to reduce the cavity resonance energy by relaxing or absorbing the energy, converting the energy to another (for example, thermal energy), and so on.

Figure 6:
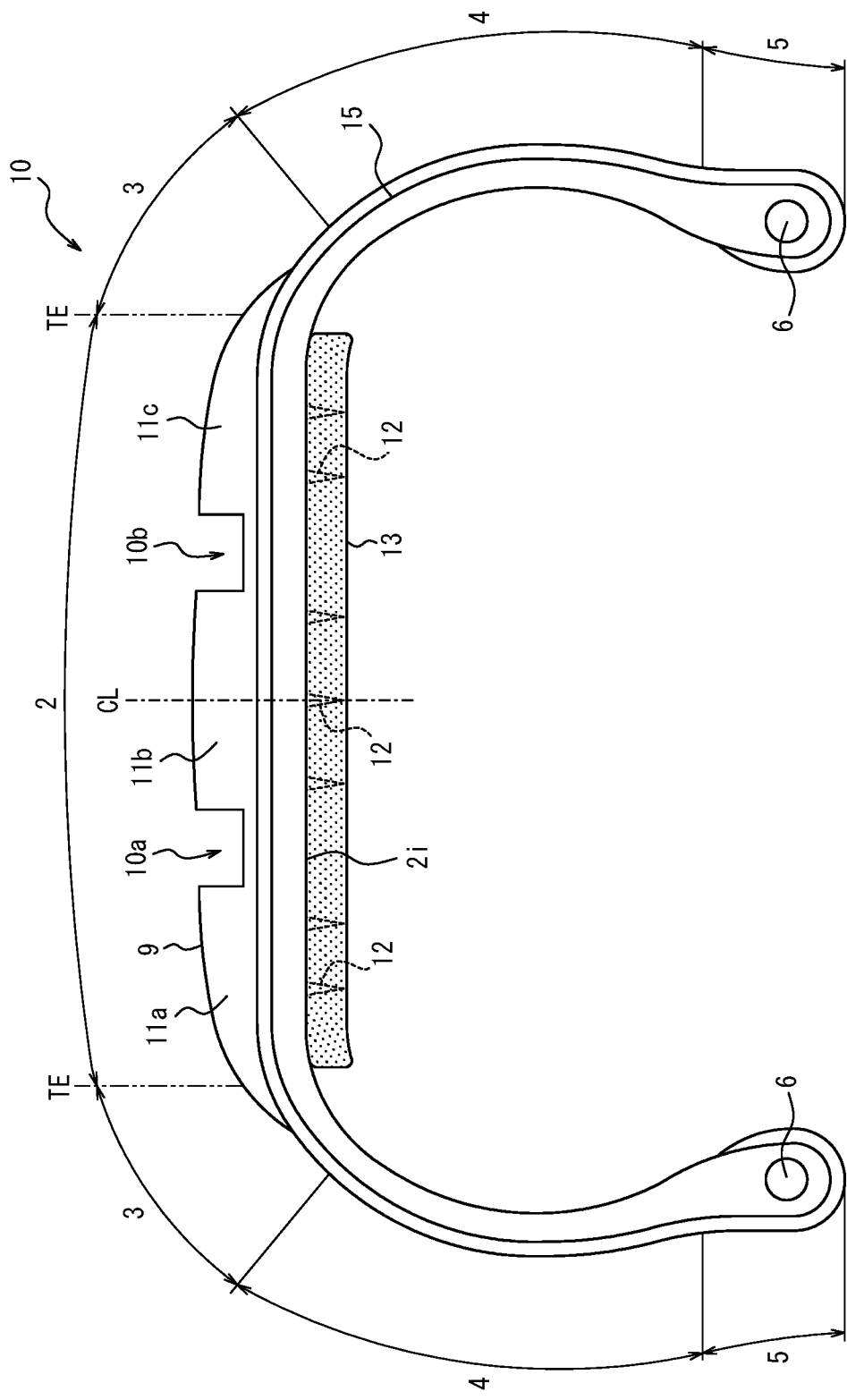
FIG. 6 is a cross-sectional view illustrating another example of the inner reinforcing structure of the tire of FIG. 1.
Figure 7:
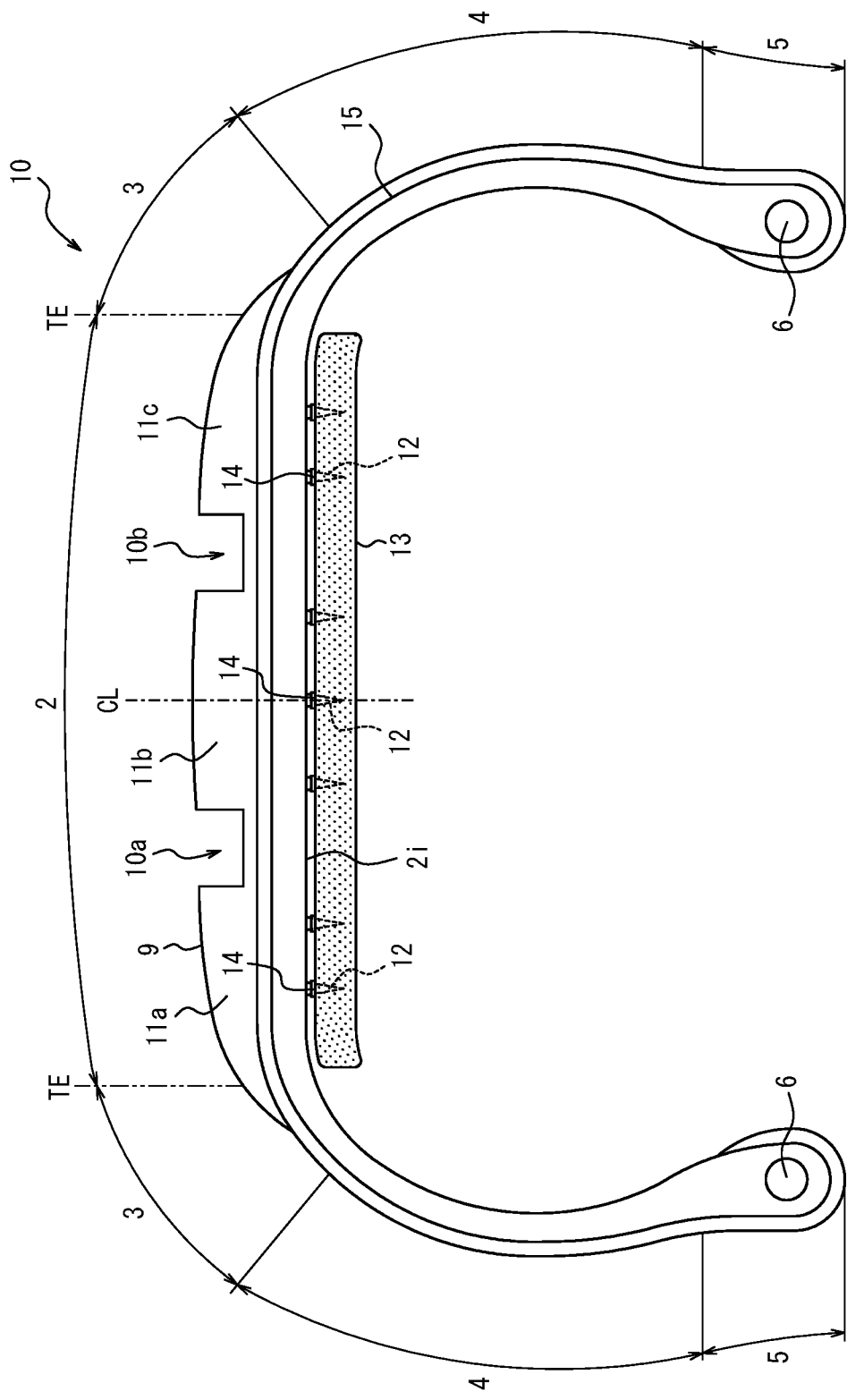
FIG. 7 is a cross-sectional view illustrating another example of the inner reinforcing structure of the tire of FIG. 2.

Although a typical tire structure has been described as the inner reinforcing structure of the tire 1, the tire may have a structure including framework parts made of resin. An exemplary tire using resin will be described below with reference to the accompanying drawings. FIG. 6 is a cross-sectional view illustrating another example of the internal reinforcing structure of the tire of FIG. 1, and FIG. 7 is a cross-sectional view illustrating another example of the internal reinforcing structure of the tire of FIG. 2. Tires 10 of FIGS. 6 and 7 each comprise a resin tire framework member 15 extending toroidally between bead cores 6 embedded in a pair of bead portions 5, across the bead portions, sidewall portions 4, a shoulder portion 3, and a tread portion 2. With this configuration, it is possible to improve the formability at the time of manufacturing and reduce the weight of the tire.

In the tires 10 of FIGS. 6 and 7, the bead cores 6 may be made of any material as long as it guarantees a desired rigidity, including, for example, metals, organic fibers, organic fibers coated with resin, and hard resin. Examples of the resin may include thermoplastic resin, thermoplastic elastomers (TPEs), and thermosetting resin.

In addition, examples of the resin of the tire framework member 15 may include, similarly to the bead cores 6, thermoplastic resin, thermoplastic elastomers (TPEs), and thermosetting resin. However, it is preferable to use a thermoplastic elastomer in view of the elasticity when the vehicle is driven and the formability during manufacturing.

As the thermoplastic elastomers may be used amide-based thermoplastic elastomers (TPAs), ester-based thermoplastic elastomers (TPCs), olefin-based thermoplastic elastomers (TPOs), styrene-based thermoplastic elastomers (TPSs), urethane-based thermoplastic elastomers (TPUs), thermoplastic rubber crosslinkers (TPVs), and other thermoplastic elastomers (TPZs) prescribed in the Japanese Industrial Standard (JIS) K6418.

As the thermoplastic resin may be used a material having a deflection temperature under load (under a load of 0.45 MPa) prescribed in ISO75-2 or ASTM D648 of 78° C. or higher, a tensile yield strength in JIS K7113 of 10 MPa or more, a tensile elongation at break (JIS K7113) in JIS K7113 of 50% or more, and a Vicat softening temperature (method A) in JIS K7206 of 130° C. or higher. The resin 4a covering the wire 4b preferably has a tensile elastic modulus (as prescribed in JIS K7113:1995) of 50 MPa or more.

In the above-described tires with the resin framework, each pin 12 may be made of any material, yet is preferably made of the same material as that of the framework member 15 and formed integrally therewith. For example, as in the framework member 15, thermoplastic resin, thermoplastic elastomers (TPEs), or thermosetting resin may be used. With the above configuration, the framework member 15 and the pins 12 have no interface in between such that a continuous member is formed, making it possible to suppress the generation of cracks at the interface between the pins 12 and the framework member 15 (the inner circumferential surface 2i). Moreover, the framework member 15 and the pins 12 can be molded at one time, which improves productivity of the tire. In particular, it is appropriate that each pin 12 has, on its proximal end side, a plane with a curvature as its outline shape near a boundary with the inner circumferential surface 2i of the tread portion as illustrated in FIG. 4B.

In the tire 10 illustrated in FIG. 7, each flange portion 14 may be made of any material, yet is preferably made of resin. For example, as with the framework member 15 and the pins 12, examples of the resin may include thermoplastic resin, thermoplastic elastomers (TPEs), and thermosetting resin. In addition, although the flange portions 14 may be made of a material different from the pins 12, from the viewpoint of durability, the flange portions and the pins are preferably made of the same material. Moreover, when the flange portions and the pins are made of the same material and integrally formed with each other, productivity and durability can be improved.

REFERENCE SIGNS LIST

1: tire
2: tread portion
2i: inner circumferential surface
4: shoulder portion
5: sidewall portion
6: bead portion
7: bead core
8: belt layer
9: tread layer
10a, 10b: circumferential groove
11a, 11b, 11c: land portion
12: pin
13: noise damper
14: flange portion

The invention claimed is:

1. A tire comprising: at least one pin protruding from an inner circumferential surface of a tread portion of the tire toward a tire radial direction inner side; and a noise damper caught by the at least one pin, wherein
the at least one pin has a distal end with a diameter smaller than that of portions other than the distal end, wherein
each of the at least one pin is provided with, at least partially on its outer circumference, a flange portion protruding in a direction transverse to an axial direction of each of the at least one pin, and wherein
the flange portion is separated in a tire radial direction from the inner circumferential surface of the tread portion.

2. The tire according to claim 1, wherein the at least one pin is a conic solid having an apex on the distal end.

3. The tire according to claim 2, wherein the at least one pin is arranged at a number density of 0.01 pcs/cm$^2$ to 0.4 pcs/cm$^2$ on the inner circumferential surface of the tread portion.

4. The tire according to claim 2, wherein the at least one pin comprises a plurality of pins and a shortest distance between adjacent ones of the pins is larger than a tire radial direction length of the pins.

5. The tire according to claim 2, wherein the at least one pin comprises a plurality of pins and a shortest distance between adjacent ones of the pins is smaller than a tire radial direction length of the pins.

6. The tire according to claim 2, wherein the inner circumferential surface of the tread portion is made of resin.

7. The tire according to claim 1, wherein the flange portion is arranged between the inner circumferential surface of the tread portion and the noise damper.

8. The tire according to claim 1, wherein the at least one pin is arranged at a number density of 0.01 pcs/cm$^2$ to 0.4 pcs/cm$^2$ on the inner circumferential surface of the tread portion.

9. The tire according to claim 8, wherein the at least one pin comprises a plurality of pins and a shortest distance between adjacent ones of the pins is larger than a tire radial direction length of the pins.

10. The tire according to claim 1, wherein the at least one pin comprises a plurality of pins and a shortest distance between adjacent ones of the pins is larger than a tire radial direction length of the pins.

11. The tire according to claim 1, wherein the at least one pin comprises a plurality of pins and a shortest distance between adjacent ones of the pins is smaller than a tire radial direction length of the pins.

12. The tire according to claim 1, wherein the inner circumferential surface of the tread portion is made of resin.

13. The tire according to claim 1, wherein each pin is a conic solid extending from the flange portion inward in the tire radial direction and gradually decreasing in diameter toward a distal end.

* * * * *